Figure 1:
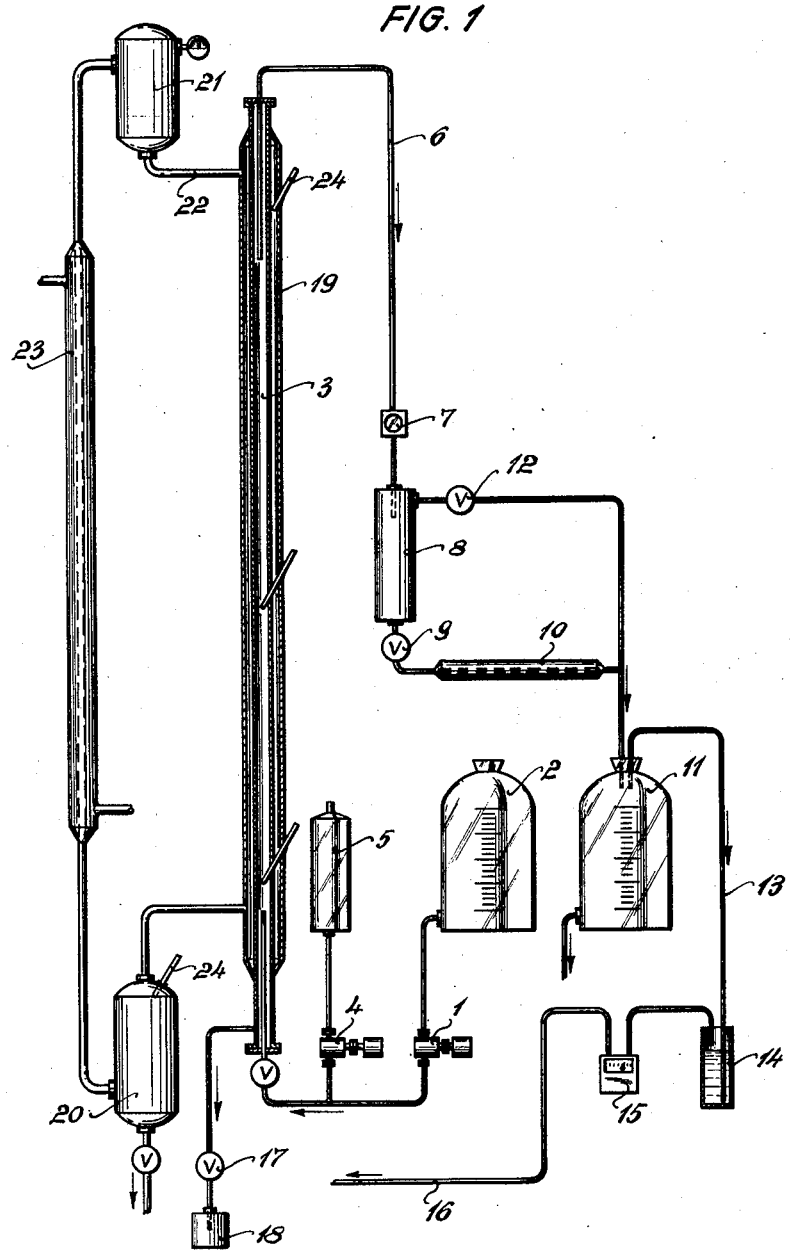

Sept. 22, 1959     K. BÜCHNER ET AL     2,905,716
PURIFICATION OF OXO ALDEHYDES
Filed July 10, 1957     2 Sheets-Sheet 1

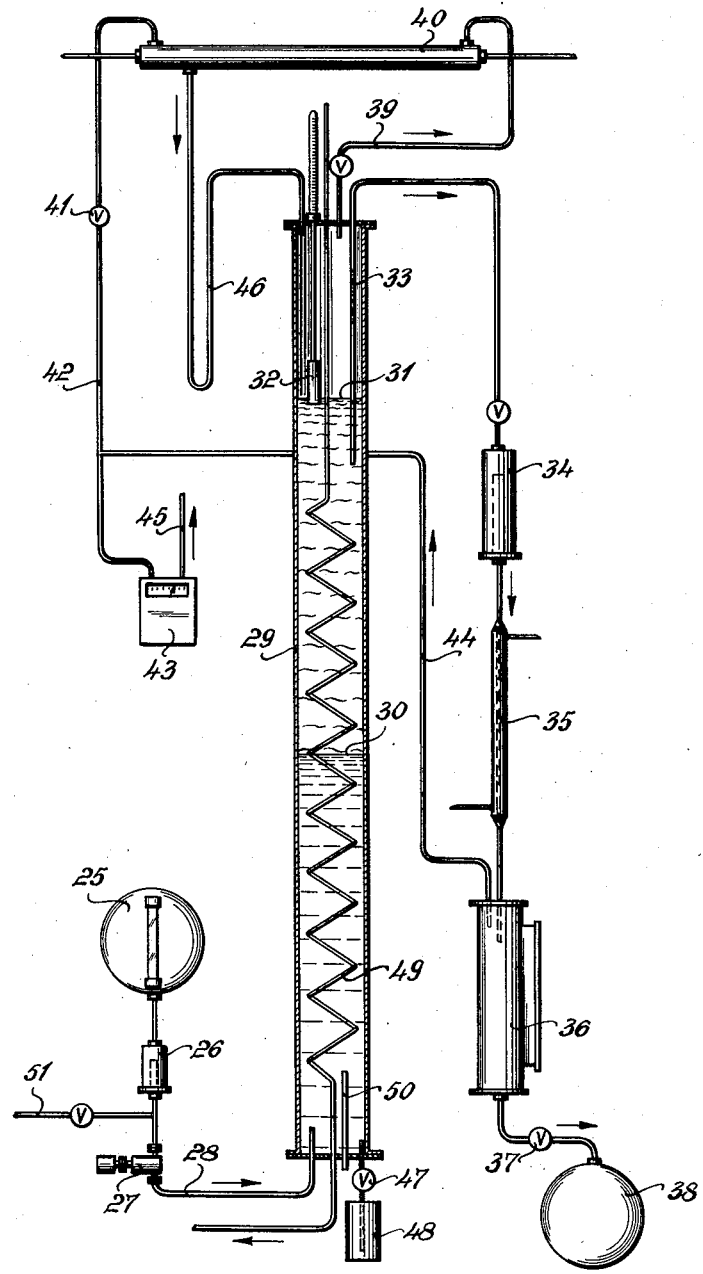

United States Patent Office 2,905,716
Patented Sept. 22, 1959

2,905,716

PURIFICATION OF OXO ALDEHYDES

Karl Büchner, Oberhausen-Sterkrade, and Josef Meis, Oberhausen-Osterfeld, Germany, assignors to Ruhrchemie Aktiengesellschaft, Oberhausen-Holten, Germany, a corporation of Germany Application July 10, 1957, Serial No. 671,083

Claims priority, application Germany July 17, 1956

7 Claims. (Cl. 260—601)

This invention relates to new and useful improvements in the purification of oxo aldehydes.

The invention more particularly relates to the process for continuously purifying metal-containing and acetal-containing aldehydes and dialdehydes such as are obtained from the oxo synthesis.

In the catalytic addition of water gas to olefins or diolefins in accordance with the oxo synthesis, reaction solutions are generally obtained which have a dark color and contain hydrocarbons, acetals and other carbon compounds in addition to the aldehydes or dialdehydes formed in the synthesis. Furthermore these solutions have a considerable metal content which is due on one hand to the catalyst used, as for example, when a cobalt catalyst is used and on the other hand to added metallic iron which may be used for initiating the synthesis and also for preventing corrosion. The metallic content of the reaction product is often additionally at least partially due to iron containing metal compounds which are present in the synthesis gas such as water gas, as for example, in the form of iron carbonyl compounds. The catalytic addition of water gas to olefinic carbon compounds as, for example, to dicyclopentadiene, generally results in dark colored solutions of the reaction product, e.g. a solution of tricyclodecane-dimethylal in toluene, which contain more or less large amounts of organic metal compounds depending upon the catalyst used. When proceeding, for example, by the process of German Patent 928,645 (British Patent 750,144), there are obtained reaction solutions which contain 1.1 grams of cobalt and 0.8 gram of iron per liter and which have an iodine color number of 250 to 300.

It has already been proposed to treat the raw oxy aldehydes with water at an elevated temperature in order to split the acetals and to precipitate the metal compounds in the form of metal hydroxides.

A very extensive mixing was always believed necessary for the water treatment so that the same was effected using mixing and distributing devices and/or by passing the raw aldehydes and the water in contact over filling bodies, such as, Raschig rings.

The use of the mixing and distributing bodies was expensive increasing the production costs and causing an extensive emulsification which would cause difficulties in separating the components after the water treatment. With the use of the filling body, such as the Raschig rings, the metal hydroxides would precipitate in a slurry on the same causing difficulty and preventing efficient removal thereof.

One object of this invention is the water purification of the metal containing and acetal containing aldehydes, such as, oxo aldehydes without the above mentioned disadvantages. This and still further objects will become apparent from the following description read in conjunction with the drawings in which:

Fig. 1 diagrammatically shows a set-up for effecting the process in accordance with the invention in which the aldehyde to be purified is mixed with water on being passed into the purification zone and, Fig. 2 diagrammatically shows a further embodiment of an apparatus for effecting the process in accordance with the invention in which the aldehyde to be purified is introduced into a body of water maintained in the purification zone.

In accordance with the invention, it has been surprisingly found that metal and acetal containing aldehydes may be very efficiently and effectively purified with water without the use of the extensive mixing, the distributing devices or filling bodies previously being necessary if the aldehyde to be purified is contacted with water at a temperature between about 150–200° C. and preferably about 180° C. under an elevated pressure in a free elongated vertically extending zone while substantially continuously introducing the aldehyde into the lower portion of the zone above the bottom thereof and substantially continuously removing purified aldehyde accumulating at the upper portion of the zone and withdrawing a portion of the water from the bottom of the zone with the metal hydroxides which precipitate during the treatment. Gas which forms during the purification, such as, carbon monoxide is removed at the upper end of the reaction zone along with the aldehyde. The pressure within the reaction vessel should be always maintained at a level that the water is still in liquid state at the reaction temperature. In general, the pressure ranges between 15 and 35 kg./sq. cm.

The term "free" as used herein and in the claims in connection with the treatment zone is intended to designate a zone which does not contain conventional distributing or mixing devices or filling bodies.

In accordance with the invention, the raw aldehyde may be introduced into the free elongated vertically extending zone which may for example be defined by a vertical reaction tube in mixture with water or a body of water may be maintained in the zone and the aldehyde to be purified passed through this water with any water losses made up intermittently or continuously.

It has been found preferable to introduce the raw aldehyde whether alone or in admixture with the water at a point having a distance from the reaction zone bottom, as for example, from the tube bottom, of about 5–10% of the entire zone length.

The time of stay of the aldehyde to be purified in the reaction zone should be about 10–30 minutes.

The process in accordance with the invention, may be applied with particular advantage to the purification of raw dialdehydes, as for example, formed by subjecting diolefins to the oxo synthesis. In this case, for example, more than about 90% of the cobalt obtained in the dialdehyde may be removed. About 80–90% of the iron present will simultaneously be removed and a lightening of the dark color of the raw aldehyde mixture will occur to a considerable extent. Iodine color numbers of the raw aldehyde, of for example, about 300, may be reduced to 15–40 units by purification in accordance with the invention. The process is similarly advantageous for purifying mono-aldehydes and iodine color numbers of approximately zero may be obtained in this connection. Such values correspond to almost complete removal of the cobalt and iron compounds.

When operating in accordance with the invention, with the introduction of the aldehyde or the aldehyde in water into the reaction zone from below, the emulsification which first occurs may be easily eliminated and sufficient time is allowed for the individual constituents to deemulsify. Thus, the difficulties encountered when operating with filling bodies, distributing devices and when using the water and aldehyde in counter current are eliminated. The continuous hydration of the metal containing and acetal containing aldehydes and dialdehydes by the process in accordance with the invention may be applied in commercial operation without difficulty and as contrasted to the prior art treatment, aldehydes which are substantially anhydrous are obtained on depressurization of the reaction mixture.

If the purification in accordance with the invention is effected in the manner that the raw aldehyde is injected into the reaction zone containing a body of water, the reaction zone should be filled with water to a certain level whereupon the aldehyde is forced through this water body. In this connection, the water body preferably is heated to a temperature of about 160°.

The invention will be explained in further detail with reference to the accompanying drawings.

Referring to Fig. 1, a pressure pump 1 continuously passes the aldehyde to be purified from the measuring bottle 2 into the vertical pressure tube 3. At the same time, a pressure pump 4 injects water from the measuring vessel 5 into the reaction tube 3 together with the aldehyde to be treated and injected by the pump 1.

The purified aldehyde flows from the top of the reaction tube 3 through a line 6 and over the sight glass 7 into a heated pressure tank 8 from which the liquid product is withdrawn through a valve 9 and passed through the cooler 10 into the measuring bottle 11. Gases which accumulate in the pressure tank 8 are withdrawn through the relief valve 12 and likewise passed to the measuring bottle 11. The gaseous constituents are withdrawn from the measuring bottle 11 through a line 13 and, after passage through the cooling trap 14, passed through the gas meter 15 and into the waste gas line 16.

The metallic slurry separating in the reaction tube 3 and the water used for hydration are withdrawn through a valve 17 provided at the bottom of the reaction tube 3 and passed to the collecting vessel 18.

The reaction tube 3 is heated by circulating water under pressure. For this purpose, the reaction tube 3 is enclosed by a jacket 19. The annular heating space thereby provided is completely filled with water under pressure except for an air cushion at the top end. Heat is supplied in the vessel 20 by an electric heating resistance. The hot water rises through the annular heating jacket 19 into the equalizing vessel 21 which communicates with the upper end of the heating jacket by a line 22. From the equalizing vessel 21, the heating medium returns to the heating vessel 20. To ensure adequately rapid hot water circulation, a cooler 23 is inserted into the return line. The temperature is controlled by the thermometer 24.

Referring to the apparatus shown in Fig. 2, the aldehyde to be purified is contained in a stock vessel 25 from which it flows through a filter 26 to the pressure pump 27 and is injected through a line 28 into the reaction vessel 29.

The reaction vessel 29 consisting of a pressure-resistant steel tube is filled with water of 180° C. to a level 30. Above the water, the aldehyde to be purified accumulates to a level 31. When this level is obtained, it is kept constant by means of a liquid level controller 32. The purified aldehyde accumulating on top of the level 31 is withdrawn from the reaction vessel 29 through a line 33 and is passed through the filter 34 and the following cooler 35 into the measuring vessel 36 from which the purified aldehyde flows through the valve 37 into the collecting tank 38.

The gaseous constituents formed in the purification of the aldehyde are withdrawn through a pipeline 39 and, after passage through the pressure cooler 40, depressurized by means of a relief valve 41 which ensures the desired pressure for the purification system of the invention, and passed through the line 42 to the gas meter 43. The gas quantities accumulating in the measuring vessel 36 also are introduced into the line 42 by means of the line 44. After the passage through the gas meter 43, the gas flows into a waste gas line 45. The liquid portions accumulating in the pressure cooler 40 are returned to the reaction vessel 29 through a siphon line 46.

The metal compounds precipitated in the reaction vessel 29 may be discharged through the valve 47 into a collecting vessel 48. The reaction vessel 29 is heated by means of a steam coil 49 through which high pressure steam is passed at, for example, 18 kg./sq. cm. The temperature in the reaction vessel 21 is controlled by a temperature measuring device 50. Any make-up water required in the reactor 29 is added through the line 51.

The following examples are given by way of illustration and not limitation.

*Example 1*

A pressure resistant steel tube of 315 cm. in length and 32 mm. in inside diameter and having a capacity of 2.5 liters was maintained at a temperature of 180° C. by circulating hot pressure water. Through the lower bottom flange of the tube a pipe 4 of 4 mm. inside diameter was extended into the steel tube to a level of 170 mm. above the bottom. Through this pipe, both the liquid aldehyde to be treated and the quantity of water required for hydration were injected in a ratio of 10:1 by means of Diesel injection pumps.

At the upper flange of the steel tube a discharge nozzle was provided adjacent to a manometer and a relief valve and extended via a sight glass to a surge tank heated at 120° C. The gas could escape from this tank through a gas meter so as to maintain the operating pressure within the reaction tube. The liquid product was depressurized in a similar manner through a Liebig condenser. A solution of tricyclodecane-dimethylal and toluene (1:4) in amount of 35 liters and produced by catalytic addition of water gas to dicyclopentadiene by means of the oxo synthesis was injected within 6.5 hours. During this time, 3.5 liters/hr. of water were injected at a uniform rate. An average pressure of 20 kg./sq. cm. developed in the tube.

Within 6.5 hours, 50 cc. of waste gas evolved which had the following composition by volume: 25.2% $CO_2$; 0.8% $C_nH_m$; 0.6% $C_nH_{2n+2}$; 58.5% CO; 3.4% $H_2$; 11.5% $N_2$; 0% $O_2$.

The dialdehyde processed had the following characteristics before and after the treatment according to the invention:

|  | Untreated | Treated |
|---|---|---|
| Iodine color number | 250–300 | 30–40 |
| Iodine number | 5 | 5 |
| Neutralization number | 3.7 | 4.4 |
| Ester number | 18.2 | 20.2 |
| Hydroxyl number | 20 | 29 |
| Carbonyl number | 83 | 85 |
| Metal content, gm./liter of— | | |
| Co | 1.19 | 0.09 |
| Fe | 0.34 | 0.07 |

During the continuous treatment effected for 6.5 hours, 3.2 liters of water which was slightly emulsified with toluene and contained 0.39 gram of cobalt and 0.12 gram of iron as dissolved formiates were withdrawn at the bottom of the tube. The precipitated metal hydroxides were suspended in the water withdrawn.

*Example 2*

To establish the residence time, 150 cc. of water were injected into the empty tube used in Example 1. Through this water stock, 1500 cc. of a tricyclodecane-dimethylal-toluene solution were injected from the bottom flange within 18 minutes in the manner described in Example 1. The pressure in the tube increased to a maximum of 20 kg./sq. cm. Five minutes after the termination of the injection, the total contents of the tube were drained within 10 minutes through a Liebig condenser and the hydrocarbon phase was separated from the aqueous phase containing the precipitated metal hydroxides in suspension. The treated material had the following characteristics as compared with the untreated starting product:

|  | Untreated | Treated |
|---|---|---|
| Iodine color number | 250–300 | 15–20 |
| Iodine number | 7 | 6 |
| Neutralization number | 3.8 | 4.6 |
| Ester number | 11.7 | 18.7 |
| Hydroxyl number | 16 | 22 |
| Carbonyl number | 76 | 78 |
| Metal content, gms./liter of— |  |  |
| Co | 1.19 | 0.06 |
| Fe | 0.48 | 0.05 |

By a treatment for 30 minutes at 144° C., the iodine color number was reduced from 250–300 to only 130–160. By a treatment for 15 minutes at 163° C. a dialdehyde having an iodine color number of 30–40 was obtained.

*Example 3*

50 liters of water were placed into a steel tube of 5 meters in length and 200 mm. in diameter, the total capacity of the tube being about 120 liters. The apparatus was heated by a steam coil located in the steel tube. After a temperature of 185° C., was reached, 50 liters/hr. of $i$—$C_{10}$ aldehyde which had been prepared from primary propylene were injected by means of a pressure pump at 18 kg./sq. cm. at a point 100 mm. above the bottom of the steel tube. This aldehyde had been prepared from trimeric propylene under conditions usual for the oxo synthesis. It was light brown in color and contained 0.028 gram of Co and 0.17 gram of Fe per liter.

The withdrawal of the treated aldehyde was started one hour after the commencement of the aldehyde injection. For this purpose, a discharge pipe extending into the steel tube from above to a level of about 1.6 meters from the top of the tube was provided. While withdrawing the aldehyde, care was taken that the opening of the discharge pipe was always immersed in the liquid phase, this being controlled by a liquid level controller.

The pressure in the reaction tube was maintained at 25 kg./sq. cm. by releasing gas as required. When, after 8 hours, 400 liters of $i$-decanal had been put through, 10 liters of water were still contained in the steel tube. These were made up to 50 liters within a short time to be reused as before. The slurry of metal or metal oxide was flushed off from the bottom after the termination of the experiment.

To remove the gas continuously forming from the carbonyls in the hydration and primarily consisting of CO, the top of the steel tube was connected to a reflux condenser which was maintained at 25 kg./sq. cm. similar to the whole of the system. The waste gas was flared. The purified aldehyde withdrawn was slightly turbid due to emulsified water but became water-white after settling of the water.

The metal content of the aldehyde had been reduced from 0.028 gram/liter of Co and 0.171 grams/liter of Fe before the treatment to 0.00 gram/liter of Co and 0.56 grams/liter of Fe in the purified aldehyde.

We claim:

1. Process for the continuous purification of an aldehyde containing metal and acetal impurities and obtained from the catalytic addition of carbon monoxide and hydrogen to carbon compounds containing olefinic double bonds which comprises passing said aldehyde upwardly through a body of water in a free, elongated vertically extending zone at a temperature between about 150–200° C. and an elevated pressure, removing purified aldehyde accumulating as an upper layer on top of said body of water, and withdrawing a portion of the water from the bottom of said zone with precipitated metal hydroxides.

2. Process according to claim 1 in which said aldehyde is passed upwardly through said body of water by being introduced into the lower portion of said zone in admixture with an amount of water substantially equivalent to the amount of water withdrawn from the bottom of said zone with precipitated metal hydroxides.

3. Process according to claim 2 in which said aldehyde is introduced into said zone at a distance from the bottom of said zone of about 5 to 10% of the entire zone length.

4. Process according to claim 1 in which said aldehyde is maintained in said zone for a period of time between about 10–30 minutes.

5. Process according to claim 1 in which said aldehyde is dialdehyde.

6. Process according to claim 1 in which said aldehyde is passed upwardly through said body of water at a temperature of about 180° C.

7. Process according to claim 1 in which the purified aldehyde is withdrawn from the upper end of said reaction zone with any gaseous constituents formed in said zone.

References Cited in the file of this patent

UNITED STATES PATENTS

| 2,679,534 | Koontz | May 25, 1954 |
| 2,757,203 | Hale | July 31, 1956 |
| 2,802,843 | Tramm et al. | Aug. 13, 1957 |
| 2,810,680 | Buchner et al. | Oct. 22, 1957 |

FOREIGN PATENTS

| 734,030 | Great Britain | July 3, 1955 |
| 736,875 | Great Britain | Sept. 14, 1955 |